UNITED STATES PATENT OFFICE.

GUSTAV SPITZ, OF BRÜNN, AUSTRIA-HUNGARY, ASSIGNOR TO GOLDSCHMIDT DETINNING COMPANY, OF NEW YORK, N. Y., A CORPORATION OF NEW JERSEY.

PROCESS OF REMOVING ENAMEL FROM ENAMELED GOODS.

1,065,401. Specification of Letters Patent. Patented June 24, 1913.

No Drawing. Application filed May 12, 1910. Serial No. 560,861.

*To all whom it may concern:*

Be it known that I, GUSTAV SPITZ, a citizen of Austria, and residing at Brünn, Austria-Hungary, have invented a certain new and useful Process of Removing Enamel from Enameled Goods, of which the following is a specification.

Heretofore it has been the practice to remove the enamel from enameled goods by treating the latter with acids or by immersing them into melted caustic alkalis. But when treating the goods with acids, the metal was strongly attacked, while the immersion into melted caustic alkalis is very troublesome and expensive and besides is connected with certain dangers to the workmen.

The present process shows none of the above disadvantages and the enamel is so perfectly removed that the goods are immediately ready for being newly enameled.

The process consists in that a layer of caustic alkalis or alkaline carbonates or a mixture of same is brought on the surfaces from which the enamel is to be removed which is best to be done in that way that the enameled goods are coated with a pulp-like mass of the materials. The objects covered with this pulp or paste are placed into the enameling furnace and are heated until the mass has melted together with the enamel. Hereby such an amount of soda is introduced into the insoluble silicates and aluminates which are constituting the enamel, that they are transformed into soluble compounds, as for instance water-glass so that the thus altered layer of enamel will easily be dissolved in hot water.

The paste which is necessary for the above process is produced for instance in that way that a solution of caustic soda of about 45–50° Bé. is mixed with the screened anhydrous carbonate of soda. This paste is brought on the enameled goods by means of a pencil, a brush, a thin iron wire or the like and must be spread on the surfaces as equally as possible.

What I claim is:

1. The process of removing enamel from enameled goods, which consists in first covering such goods with a paste of caustic alkali, heating the articles, and then dissolving the formed soluble compounds.

2. The process of removing enamel from enameled goods, which consists in first covering such goods with a paste of a substance which when heated acts as a caustic alkali, heating the articles, and then dissolving the formed soluble compounds.

3. The process of removing enamel from enameled goods, which consists in first covering such goods with a paste containing a mixture of caustic alkali and alkali carbonate, heating the articles, and then dissolving the formed soluble compounds.

4. The process of removing enamel from enameled goods, which consists in covering such goods with a paste of caustic soda, heating the mass and dissolving the formed soluble compounds by treating the mass with water.

5. The process of removing enamel from enameled goods, which consists in covering such goods with a paste of a mixture of caustic soda and carbonate of soda, heating the mass and dissolving the formed soluble compounds by treating the mass with water.

6. The process of removing enamel from enameled goods, which consists in covering such goods with a paste consisting of carbonate of soda mixed with a concentrated solution of sodium hydroxid, heating the mass and dissolving the formed soluble compounds by treating the mass with water.

In witness whereof I have hereunto set my hand in presence of two witnesses.

GUSTAV SPITZ.

Witnesses:
ADA MARCH BERGER,
AUGUST FUGGER.